United States Patent
Tsujii

(10) Patent No.: US 9,350,884 B2
(45) Date of Patent: May 24, 2016

(54) COMMUNICATION APPARATUS FOR CONTROLLING A DISPLAY MENU DEPENDENT UPON A WRITE INHIBIT STATE OF A RECORDING MEDIUM

(71) Applicant: CANON KABUSHIKI KAISHA, Tokyo (JP)

(72) Inventor: Hideaki Tsujii, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/047,338

(22) Filed: Oct. 7, 2013

(65) Prior Publication Data

US 2014/0043644 A1    Feb. 13, 2014

Related U.S. Application Data

(62) Division of application No. 12/943,133, filed on Nov. 10, 2010, now Pat. No. 8,699,059.

(30) Foreign Application Priority Data

Dec. 18, 2009 (JP) .................................. 2009-288420

(51) Int. Cl.
*G06F 3/12* (2006.01)
*H04N 1/00* (2006.01)

(52) U.S. Cl.
CPC .......... *H04N 1/00053* (2013.01); *G06F 3/1206* (2013.01); *G06F 3/1229* (2013.01); *G06F 3/1288* (2013.01); *G06F 3/1292* (2013.01); *G06F 3/1209* (2013.01)

(58) Field of Classification Search
CPC .......................... H04N 1/00053; G06F 3/1229

USPC ................................................ 358/1.14, 1.15
See application file for complete search history.

(56) References Cited

U.S. PATENT DOCUMENTS

| 5,481,698 A * | 1/1996 | Itoh ...................... G06F 9/4843 |
|---|---|---|
| | | 709/206 |
| 2004/0169728 A1 * | 9/2004 | Kuwano ............. H04N 1/00098 |
| | | 348/207.2 |

(Continued)

OTHER PUBLICATIONS

Motonobu Takahashi, Windows cooperate with UNIX by using Service for UNIX 3.5 (Japanese version), UNIX User, Japan, Soft Bank Publishing Corp., Apr. 1, 2004, vol. 13, No. 4, pp. 44-53.

(Continued)

*Primary Examiner* — Benjamin O Dulaney
(74) *Attorney, Agent, or Firm* — Cowan, Liebowitz & Latman, P.C.

(57) ABSTRACT

A communication apparatus includes a communication unit configured to communicate with a control apparatus, which has a recording unit and executes processing in accordance with a command written to the recording unit, an accepting unit configured to accept selection of a command by a user, and a writing unit configured to write the selected command to the recording unit, and the communication apparatus comprises: a sensing unit configured to sense connection to the control apparatus via the communication unit; a determination unit configured to determine whether the recording unit has been set to a write inhibit state if the connection has been sensed by the sensing unit; and a notification unit configured to notify the user of the fact that the recording unit has been set to the write inhibit state, if the determination unit determines that the recording unit has been set to the write inhibit state.

31 Claims, 10 Drawing Sheets

(56) References Cited

U.S. PATENT DOCUMENTS

2007/0216938 A1* 9/2007 Tomita .................. G06F 3/0486 358/1.15
2008/0052384 A1* 2/2008 Marl .................. H04L 12/2807 709/223

OTHER PUBLICATIONS

Oct. 4, 2013 Japanese Office Action, which is enclosed without an English Translation, that issued in Japanese Patent Application No. 2009-288420.

Motonobu Takahashi, Windows cooperate with UNIX by using Service for UNIX 3.5 (Japanese version), UNIX User,Japan, Soft Bank Publishing Corp., Apr. 1, 2004, vol. 13, No. 4, pp. 44-53 with partial trnslation thereof. (Article originally submiited without English translation in the Information Disclosure Statement filed Oct. 25, 2013).

Oct. 4, 2013 Japanese Office Action, which is enclosed with an English Translation, that issued in Japanese Patent Application No. 2009-288420.

* cited by examiner

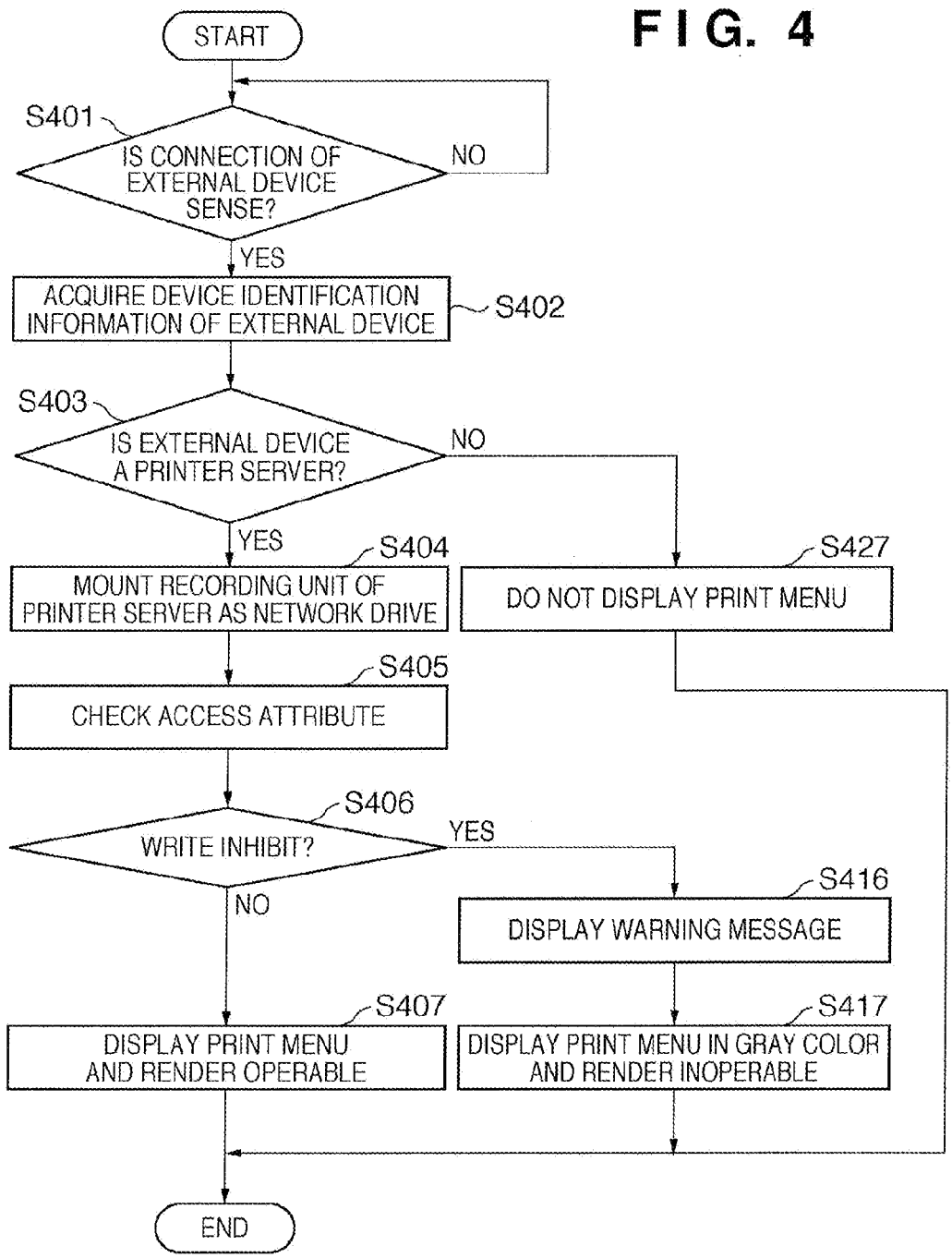

FIG. 6

TO CONTROL PRINT FUNCTION,
SET RECORDING AREA OF
PRINTER SERVER TO
WRITE-ENABLE ATTRIBUTE

PRINT STOP — 601

FIG. 7

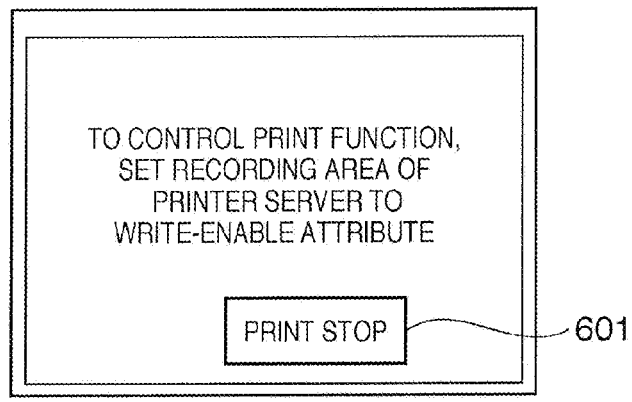

| id | SCREEN | OVERVIEW |
|---|---|---|
| – | (NO ICON) | PRINTER SERVER NOT CONNECTING |
| 0 | | NO PRINTER (GRAY COLOR) |
| 1 | | CURRENTLY CONNECTED (WHITE COLOR / FLASHING) |
| 2 | | PRINTING STANDBY (WHITE COLOR) |
| 3 | | PRINTING IN PROGRESS (WHITE COLOR / ANIMATION) |
| 4 | | PRINT INHIBIT (YELLOW COLOR) |
| 5 | | PRINTING ERROR (RED COLOR) |
| 6 | | INFORMATION NOT ACQUIRABLE (RED COLOR / FLASHING) |

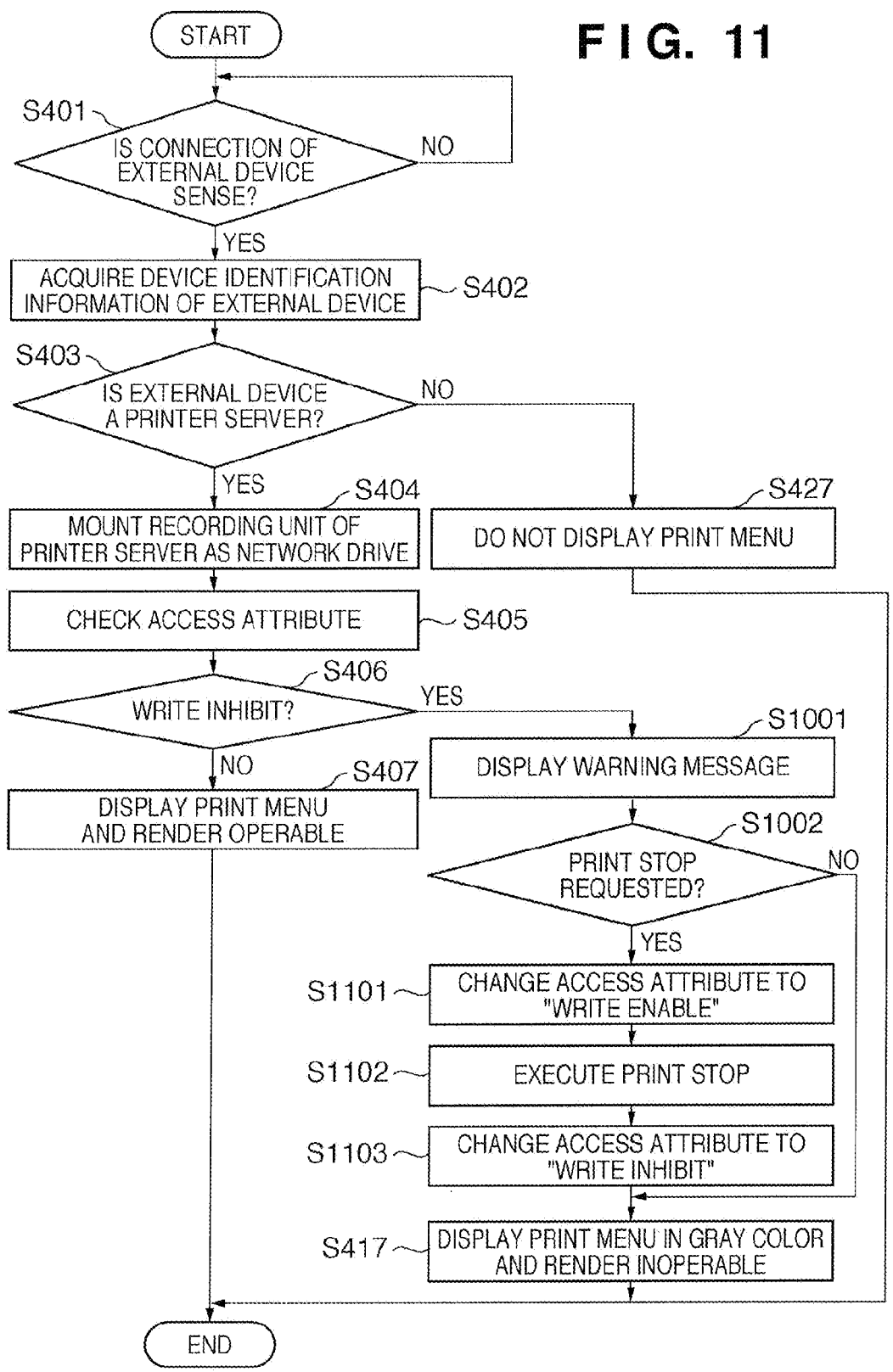

COMMUNICATION APPARATUS FOR CONTROLLING A DISPLAY MENU DEPENDENT UPON A WRITE INHIBIT STATE OF A RECORDING MEDIUM

This application is a divisional of application Ser. No. 12/943,133, filed Nov. 10, 2010 the entire disclosure of which is hereby incorporated by reference.

BACKGROUND OF THE INVENTION

1. Field of the Invention

The present invention relates to a communication apparatus and to a method of controlling the communication apparatus.

2. Description of the Related Art

A technique known in the art makes it possible for a client PC (personal computer) that does not support a printing protocol such as LPR (Line Printer Remote) to execute printing via a printer server (see the specification of Japanese Patent Laid-Open No. 6-187113). In accordance with Japanese Patent Laid-Open No. 6-187113, a printer server controls a printer so as to perform printing based upon print data that a client personal computer has written to a file stored in a recording unit of the printer server. As a result, if the client personal computer supports a file sharing protocol such as NFS (Network File System), then the client personal computer is capable of executing printing through the intermediary of the printer server even if the computer does support the printing protocol.

According to a further technique known in the art, a communication apparatus such as a personal computer writes a command to a file stored in a recording unit of a control apparatus such as a printer server, and the control apparatus executes processing in accordance with the written command. If this technique is used and the communication apparatus supports a file sharing protocol, then the communication apparatus can cause the control apparatus to execute processing in accordance with the command even if the communication apparatus does not support the control protocol of the control apparatus. For example, a client personal computer that does not support the above-mentioned printing protocol is capable of causing a printer server to execute printing based upon print data and, in addition, is capable of causing the printer server to acquire the operating status of the printer and to perform detailed print settings and the like.

In a case where the recording unit of the above-described control apparatus has been set to write inhibit, the communication apparatus cannot deliver a command to the control apparatus via a file that has been stored in the recording unit. As a consequence, there is a possibility that the user of the communication apparatus will operate the communication apparatus in an attempt to cause the control apparatus to execute processing in accordance with a command of some kind without the user being aware of the fact that the recording unit of the control apparatus has been set to write inhibit. A write error will occur in such case. To the user, however, who has operated the communication apparatus for the purpose of causing the control apparatus to execute processing, writing to the recording unit is not the immediate purpose. Consequently, there is the possibility that the user will not be able to comprehend the cause of the write error and, as a result, will not be able to understand why processing by the control apparatus is not executed normally. Further, even in a case where the user can comprehend the cause of the write error, the user will realize the fact that the control apparatus does not accept a command only after the user actually operates the communication apparatus in an attempt to cause the control apparatus to execute processing in accordance with some sort of command. It is likely that a situation of this kind will detract from the user friendliness of the communication apparatus.

SUMMARY OF THE INVENTION

The present invention has been devised in view of the foregoing circumstances and provides a technique for enhancing the user friendliness of a communication apparatus that is configured to write a command, which is used by a control apparatus, to a recording unit of the control apparatus.

According to an aspect of the present invention, there is provided a communication apparatus including a communication unit configured to communicate with a control apparatus, which has a recording unit and executes processing in accordance with a command that has been written to the recording unit, an accepting unit configured to accept selection of a command by a user, and a writing unit configured to write the selected command to the recording unit, the communication apparatus comprising: a sensing unit configured to sense connection to the control apparatus via the communication unit; a determination unit configured to determine whether the recording unit has been set to a write inhibit state if the connection has been sensed by the sensing unit; and a notification unit configured to notify the user of the fact that the recording unit has been set to the write inhibit state, if the determination unit determines that the recording unit has been set to the write inhibit state.

According to another aspect of the present invention, there is provided a method of controlling a communication apparatus including a communication unit configured to communicate with a control apparatus, which has a recording unit and executes processing in accordance with a command that has been written to the recording unit, an accepting unit configured to accept selection of a command by a user, and a writing unit configured to write the selected command to the recording unit, the method comprising: a sensing step of sensing connection to the control apparatus via the communication unit; a determination step of determining whether the recording unit has been set to a write inhibit state if the connection has been sensed; and a notification step of notifying the user of the fact that the recording unit has been set to the write inhibit state, if it is determined that the recording unit has been set to the write inhibit state.

By virtue of the arrangement described above, the present invention makes it possible to enhance the user friendliness of a communication apparatus that is configured to write a command, which is used by a control apparatus, to a recording unit of the control apparatus.

Further features of the present invention will become apparent from the following description of exemplary embodiments (with reference to the attached drawings).

BRIEF DESCRIPTION OF THE DRAWINGS

FIG. 4 is a flowchart illustrating processing executed by the mobile personal computer 100 when the printer server 200 is connected in the first embodiment;

FIG. 6 is a diagram illustrating an example of display of a warning message in a case where write inhibit has been applied;

FIG. 7 is a diagram illustrating examples of printer icons;

FIG. 11 is a flowchart illustrating processing executed by the mobile personal computer 100 when the printer server 200 is connected in the fourth embodiment.

DESCRIPTION OF THE EMBODIMENTS

Embodiments of the present invention will be described with reference to the accompanying drawings. In each of the embodiments described below, a mobile personal computer is used as an example of a communication apparatus according to the present invention. Further, it will be assumed that the mobile personal computer communicates with a printer server, which is one example of a control apparatus. However, examples of the communication apparatus and control apparatus are not limited to these. For example, a digital camera or the like can be used as the communication apparatus, and a file server or the like can be used as the control apparatus. It should be noted that it is possible for the embodiments below to be combined in suitable fashion.

First Embodiment

Figure 1:
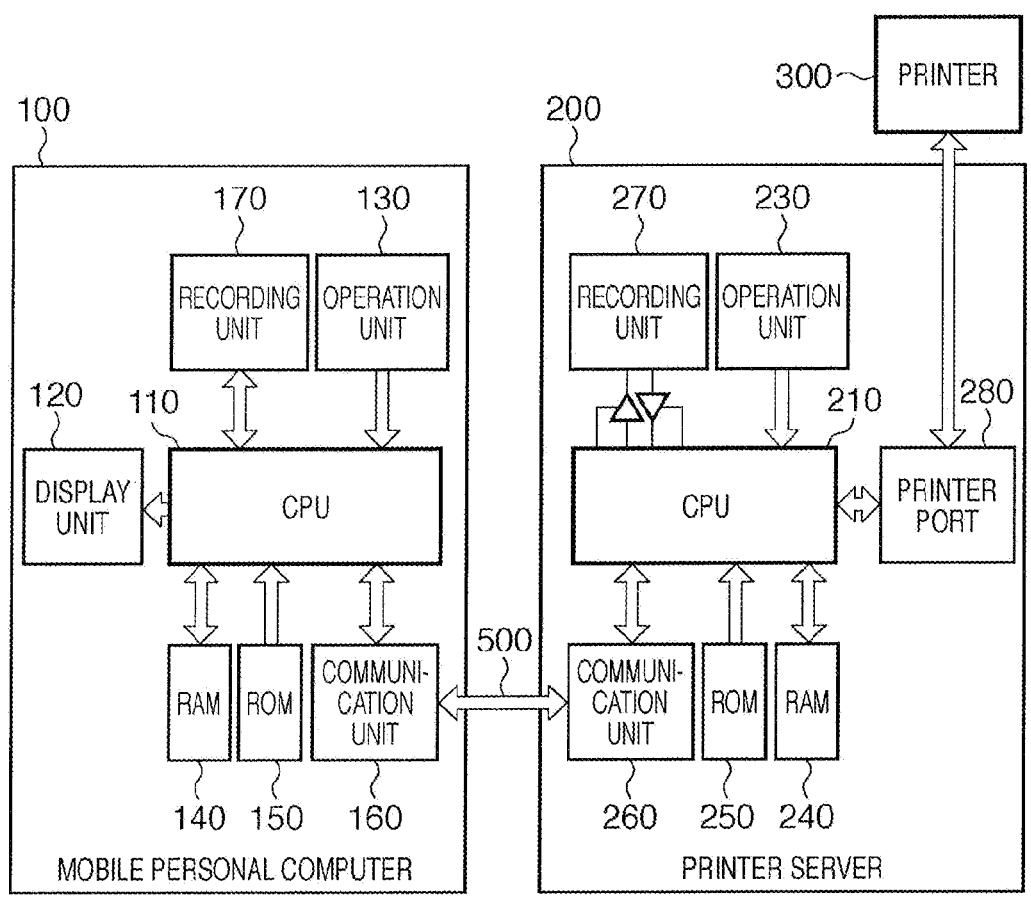
FIG. 1 is a block diagram illustrating the configurations of a mobile personal computer 100 and printer server 200 according to first, second and fourth embodiments of the present invention.

FIG. 1 is a block diagram illustrating the configurations of a mobile personal computer 100 and printer server 200 according to a first embodiment of the present invention. The mobile personal computer 100 and printer server 200 have communication units 160 and 260, respectively, and are capable of being connected via a communication line 500. Although the communication scheme used by the communication units 160 and 260 may be any scheme, the block diagram used in this embodiment is premised on a wired communication scheme.

In the mobile personal computer 100, the CPU 110 includes a processor core and peripheral circuits such as a general-purpose I/O port and an AD converter and is capable of executing a program. A RAM 140 serving as a primary storage device and a ROM 150 serving as a secondary storage device in which a program has been stored are connected to the CPU 110. A recording unit 170 is used as a recording medium for storing image files and document files. A display unit 120 is used to display system information as well as information of various files that have been stored in the recording unit 170. A operation unit 130 is used by the user to operate the mobile personal computer 100.

In the printer server 200, the CPU 210 includes a processor core and peripheral circuits such as a general-purpose I/O port and an AD converter and is capable of executing a program. A RAM 240 serving as a primary storage device and a ROM 250 serving as a secondary storage device in which a program has been stored are connected to the CPU 210. A recording unit 270 is a recording medium for storing a file (control file) in which a command for controlling the printer server 200 has been written. A operation unit 230 is used by the user to operate the printer server 200. A printer port 280 includes an interface for connecting a printer 300. Therefore, control of the printer 300 from the CPU 210 is possible.

It should be noted that a file need not necessarily be used when a command is written. For example, the mobile personal computer 100 may write a command to a specific address of the recording unit 270 and the printer server 200 may execute processing in accordance with the command that has been written to this specific address.

The CPU. 210 is capable of allowing a client the mobile personal computer 100, for example) to share the recording unit 270 by using file sharing protocol such as NFS. As for the setting of the access attribute for sharing, it is possible to set a "write-enable attribute", a "read-only attribute" and the like. In this specification, setting a "read-only attribute" is also referred to as setting "write inhibit". The setting of write inhibit may be implemented by software or by hardware such as a write-protect switch. If the recording unit 270 is set to write inhibit, a file cannot be written to the recording unit 270 and a file cannot be updated by, for example, writing a command to the file that has been stored in the recording unit 270. By way of example, the user can set the recording unit 270 to write inhibit by operating the operation unit 230 for the purpose of maintenance work such as replacement of ink or replenishment of paper in the printer 300 connected to the printer server 200.

Figure 2A:
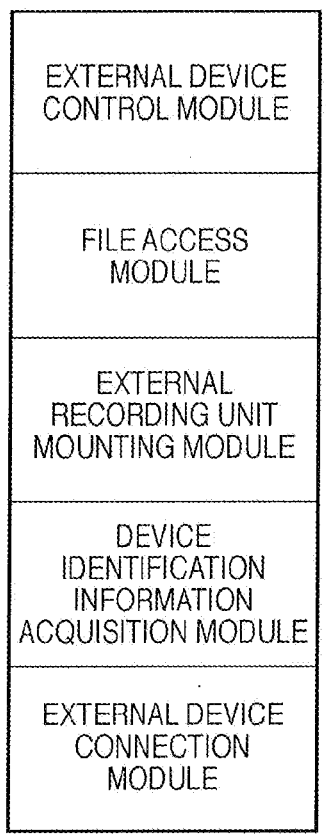
FIG. 2A is a program stack in a CPU 110 of the mobile personal computer 100.

FIG. 2A is a diagram of program stack which, by being read in and executed by the CPU 110 of mobile personal computer 100, causes the CPU 110 to function as various means. Starting from the lowermost layer, the stack includes an external device connection module, a device identification information acquisition module, an external recording unit mounting module, a file access module and an external device control module in the order mentioned.

The external device connection module is a module for sending and receiving data to and from a device, which is connected to the communication line 500, through the communication unit 160, and for detecting whether an external device has been connected. The device identification information acquisition module is a module which, if the connection of an external device has been detected by the external device connection module, is for acquiring the device identification information of the external device, such as the physical address or device name information capable of being acquired by the initial communication with the external device. By referring to a previously stored registration list, the device identification information acquisition module acquires the functions of the external device corresponding to the acquired device identification information. The registration list may be stored in the mobile personal computer 100 or may be stored in another external device and acquired from this other external device as necessary. The external recording unit mounting module is a module for mounting the recording unit of an external device in the mobile personal computer 100 by using a file sharing protocol. The access attributes of the recording unit of the external device can also be acquired by the external recording unit mounting module. The file access module is a module for accessing a file, which has been stored in the recording unit of the external device, through the external recording unit mounting module. The external device control module is a module for controlling an external device by writing and reading data to and from a file, which has been stored in the recording unit of the external device, via the file access module. The external device control module causes the external device to execute processing by, for example, setting the functions of the external device, acquiring various information from the external device or accepting and delivering commands from and to the external device.

Figure 2B:
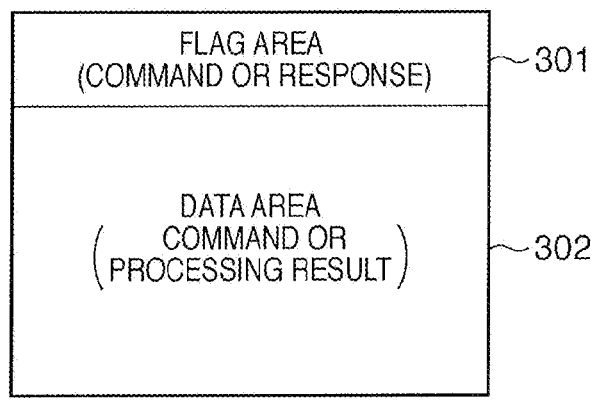
FIG. 2B is a diagram illustrating the file format of a control file, which has been stored in a recording unit 270, for controlling the printer server 200.

FIG. 2B is a diagram illustrating the file format of a control file, which has been stored in the recording unit 270, for controlling the printer server 200. A flag area 301 exists at the beginning of the file. A command flag indicating that this is a command from the CPU 110 or a response flag indicating that this is a response from the CPU 210 is written to the flag area 301. A command from the CPU 110 or a result of processing from the CPU 210 is written to a data area 302. It should be noted that a file need not necessarily be used when a command is written, as mentioned above. For example, a prescribed address of the recording unit 270 may be allocated as the flag area 301 and that another prescribed address may be allocated as the data area 302.

Figure 3A:
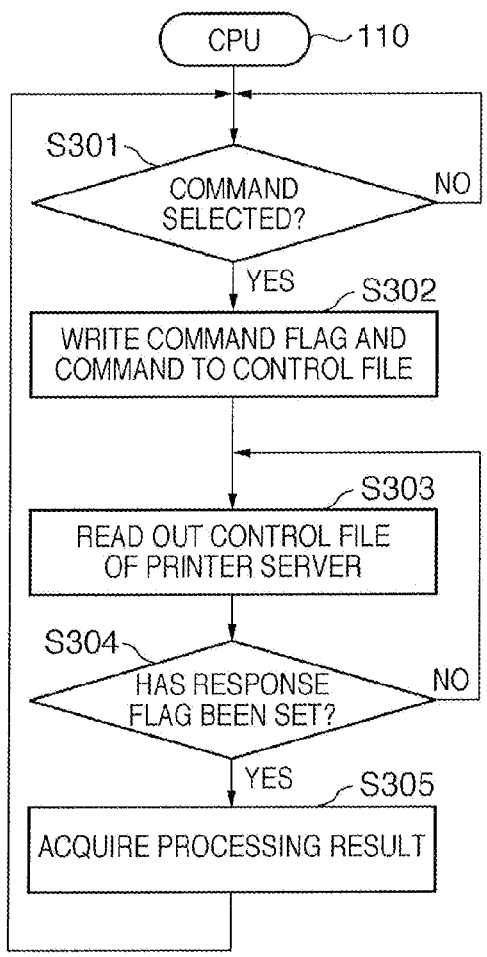
FIG. 3A is a flowchart illustrating processing according to which the CPU 110 of the mobile personal computer 100 controls the printer server 200 via the control file that has been stored in the recording unit 270.

FIG. 3A is a flowchart illustrating processing according to which the CPU 110 of the mobile personal computer 100 controls the printer server 200 via the control file that has been stored in the recording unit 270. At step S301, the CPU 110 accepts selection of a command by the user. The command selected instructs start of printing, end of printing, notification of amount of remaining ink and the like. Processing proceeds to step S302 when a command is selected. At step S302, the CPU 110 writes the command flag and the selected command to the control file that has been stored in the recording unit 270 of printer server 200. If a control file does not exist in the recording unit 270, then the CPU 110 may generate a command file in which the command flag and selected command have been written and may write the generated command file to the recording unit 270 at step S302.

Figure 3B:
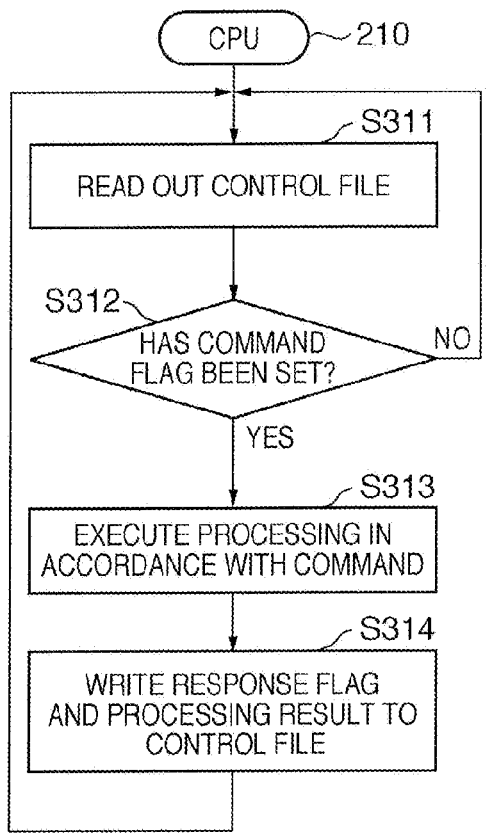
FIG. 3B is a flowchart illustrating the flow through which a CPU 210 of the printer server 200 executes processing in accordance with a command that has been written to a file stored in the recording unit 270.

Reference will be made to FIG. 3B. FIG. 3B is a flowchart illustrating the flow through which the CPU 210 of printer server 200 executes processing in accordance with a command that has been written to a file stored in the recording unit 270. At step S311, the CPU 210 reads out the control file. At step S312, the CPU 210 determines whether a command flag has been set in the control file. If a command flag has not been set, control returns to step S311 and the CPU 210 reads out the control file again, this being performed at prescribed intervals. If a command has been set, processing proceeds to step S313. At step S313, the CPU 210 executes processing in accordance with the command that has been written to the control file. At step S314, the CPU 210 writes data, which indicates the result of processing at step S313, to the control file and sets the response flag in the control file.

With reference again to FIG. 3A, the CPU 110 reads the control file out of the recording unit 270 of printer server 200 at step S303. At step S304, the CPU 110 determines whether a response flag has been set in the control file. If a response flag has not been set, control returns to step S303 and the CPU 110 reads out the control file again, this being performed at prescribed intervals. If a command has been set, processing proceeds to step S305. At step S305, the CPU 110 acquires the result of processing from the control file. The processing result acquired is that which was written by the CPU 210 of printer server 200 at step S314.

Control of the printer server 200 through the intermediary of a control file is achieved by the processing described above. However, in a case where the recording unit 270 of printer server 200 has been set to "write inhibit", the CPU 110 cannot write a command flag and command to the control file at step S302. At step S312, therefore, detection of the command flag does not occur and control of the printer server 200 becomes impossible. Accordingly, in this embodiment, the mobile personal computer 100 notifies the user of the fact that the recording unit 270 has been set to "write inhibit", as will be described below in detail.

FIG. 4 is a flowchart illustrating processing executed by the mobile personal computer 100 when the printer server 200 is connected. At step S401, the CPU 110 senses whether an external device has been connected to the communication unit 160. If connection of an external device is sensed, processing proceeds to step S402. At step S402, the CPU 110 acquires the device identification information of the external device. At step S403, the CPU 110 determines whether the connected external device is the printer server 200. Processing proceeds to step S404 if the external device is the printer server 200 or to step S427 if the external device is not the printer server 200. It should be noted that since the external device is not limited to the printer server 200, the processing at step S403 is, in a broad sense, processing for determining whether the external device is a control device of the type that executes control according to the method described above with reference to FIG. 3B. A "YES" decision rendered at both steps S401 and S403 means that connection of a control device of the type that executes control according to the method described above with reference to FIG. 3B has been sensed.

At step S404, the CPU 110 mounts the recording unit 270 of printer server 200 as network drive. At step S405, the CPU 110 checks the access attribute of the mounted drive. At step S406, the CPU 110 determines whether the recording unit 270 has been set to "write inhibit". Processing proceeds to step S416 in case of write inhibit or to step S407 otherwise. At step S407, the CPU 110 displays a print menu 501 shown in FIG. 5A and makes it possible to operate the print menu 501. If the user selects the print menu 501 via the operation unit 130, the CPU 110 displays a submenu shown in FIG. 5B. In the submenu, the user is capable of selecting printer select 502, detailed setting 503, print stop 504 and print inhibit 505 and the like. Each item corresponds to a command of the printer server 200. Selecting an item corresponds to selecting a command, and the CPU 110 accepts the selection. Further, as far as the user is concerned, the print menu 501 and submenu are also items of information indicating that the printer server 200 has been connected.

If write inhibit has been determined at step S406, then the CPU 110 displays the window of a warning message, shown in FIG. 6, at step S416. In this way the user is capable of recognizing that the printer server 200 cannot be controlled because the recording unit 270 has been set to write inhibit. Although there are cases where this window includes a print stop button 601, this will be described in another embodiment. The notification given at step S416 may just as well be implemented by a beep tone, for example, rather than by a display. The warning message may be displayed continuously during the time that the printer server 200 is connected or may be extinguished upon elapse of a prescribed period of time. At this time the mobile personal computer 100 is not capable of executing control of the printer server 200 via a control file but is capable of performing other communication with the printer server 200. It is therefore unnecessary to terminate communication with the printer server 200.

Figure 5A:
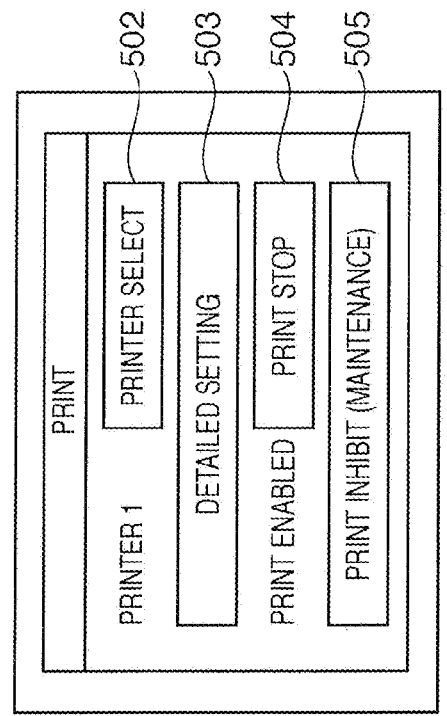
FIG. 5A is a diagram illustrating an example of display of a print menu in a case where write inhibit has not been applied.
Figure 5B:
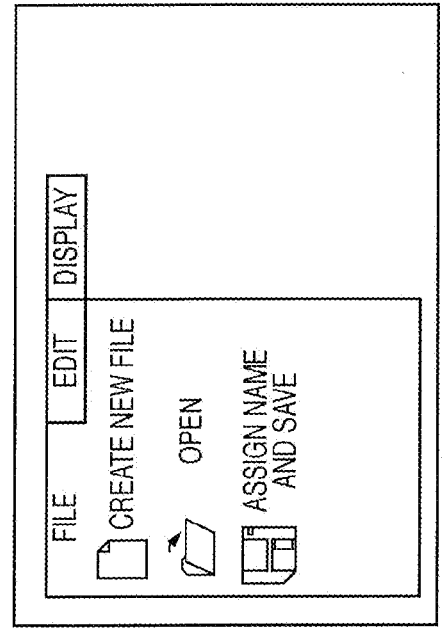
FIG. 5B is a diagram illustrating an example of display of a submenu.
Figure 5C:
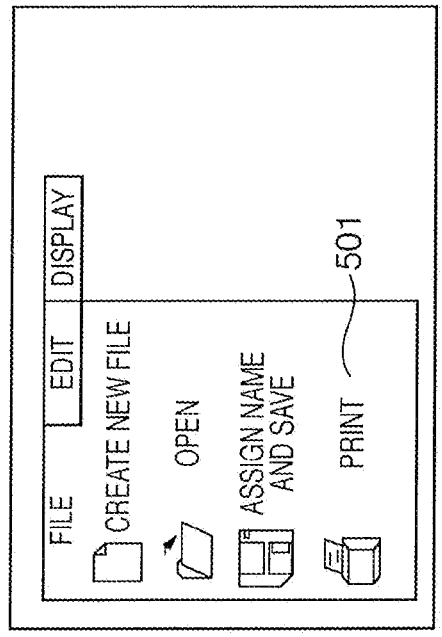
FIG. 5C is a diagram illustrating an example of display of a print menu in a case where write inhibit has been applied.

At step S417, the CPU 110 displays a print menu 506 in a gray color, as shown in FIG. 5C, and disables operation of the print menu 506. As far as the user is concerned, the print menu 506 and submenu are also items of information indicating that the printer server 200 has been connected. However, since the print menu 506 has an appearance different from that of the print menu 501, the user can recognize that the printer server 200 is not controllable.

Figure 5D:
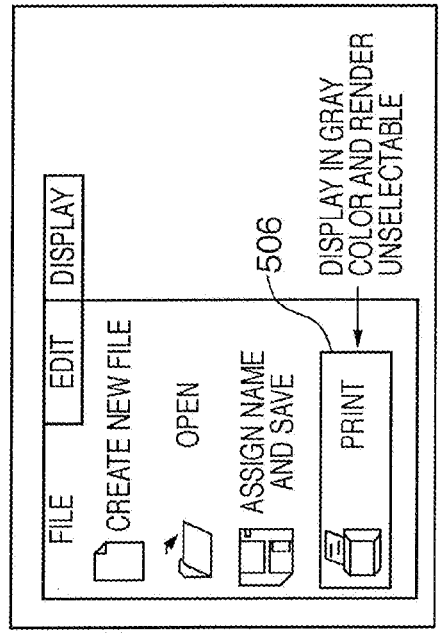
FIG. 5D is a diagram illustrating a state in which a print menu is not displayed.

If the printer server 200 has not been connected, in step S427, the CPU 110 does not allow display of the print menu (see FIG. 5D).

It should be noted that the user can be notified of various states of the printer 300 by changing the printer icon shown in FIGS. 5A and 5C. FIG. 7 is a diagram illustrating examples of printer icons. In a case where the printer server 200 is capable of being controlled normally, the CPU 110 displays icons id0 to id4 in FIG. 7 in accordance with the status of the printer server 200. In a case where an error has occurred in the printer 300 connected to the printer server 200, the CPU 110 displays an icon id5. In a case where the printer server 200 is incapable of being controlled, the CPU 110 displays an icon id6, thereby notifying the user of the fact that the printer server 200 is not capable of being controlled.

In accordance with this embodiment, as described above, when the printer server 200 is connected, the mobile personal computer 100 determines whether the recording unit 270 of printer server 200 has been set to write inhibit. If the recording unit 270 has been set to write inhibit, the mobile personal computer 100 so notifies the user. Accordingly, before the user selects a command for the printer server 200, the user is capable of recognizing that the recording unit 270 has been set to write inhibit. As a result, there is diminished possibility that the user will select a command despite the fact that writing of the command is not possible. This improves user friendliness of the printer server 200. Further, in a case where the mobile personal computer 100 disables operation of the print menu (that is, a case where the mobile personal computer 100 exercises control in such a manner that selection of a command is not accepted), a further improvement in user friendliness of the printer server 200 is obtained.

Second Embodiment

The first embodiment is such that even in a case where the recording unit 270 has been set to write inhibit, the mobile personal computer 100 displays the print menu (although the external appearance of which is different). On the other hand, the second embodiment is such that in a case where the recording unit 270 has been set to write inhibit, the mobile personal computer 100 does not display the print menu. In this way the user can be prevented from selecting a command irrespective of the fact that writing, of a command is impossible. This improves the user friendliness of the printer server 200. This will be described with reference to FIG. 8.

Figure 8:
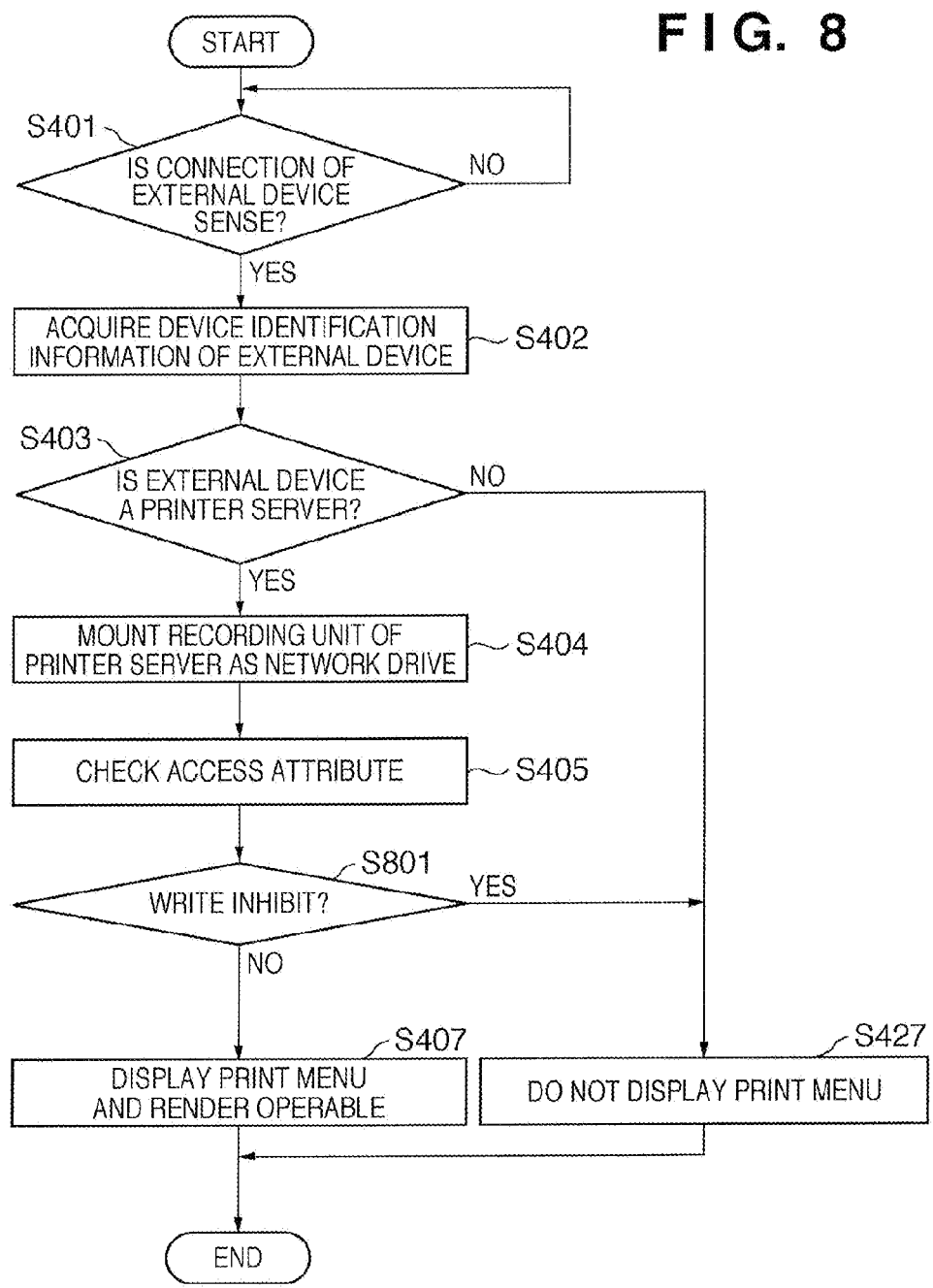
FIG. 8 is a flowchart illustrating processing executed by the mobile personal computer 100 when the printer server 200 is connected in the second embodiment.

The second embodiment is similar to the first embodiment except for the fact that the flowchart of FIG. 8 is used instead of the flowchart of FIG. 4. Further, processing steps in FIG. 8 identical with or similar to those in FIG. 4 are designated by like step numbers and need not be described again.

At step S801, the CPU 110 determines whether the recording unit 270 has been set to "write inhibit". Processing proceeds to step S427 in case of write inhibit (this embodiment differs from the first embodiment in this respect) or to step S407 otherwise.

By virtue of the above processing, the mobile personal computer 100 does not display the print menu in a case where the recording unit 270 has been set to write inhibit. As a result, the user friendliness of the printer server 200 is enhanced, as described above. Further, since display of a warning message (see steps S416 and S417 in FIG. 4), etc., is unnecessary, the implementation of the printer server 200 can be simplified.

Third Embodiment

Consider a case where the recording unit 270 of printer server 200 has not been set to "write inhibit" and communication is disconnected owing to failure of the communication line 500 while the mobile personal computer 100 is writing print data to a control file in the printer server 200. Then assume that the recording unit 270 is subsequently set to "write inhibit". In this case, even when the communication line 500 is restored, the mobile personal computer 100 cannot write to the control file. This means that information about a print job suspended while in progress cannot be acquired and that the print job cannot be cancelled. Hence there is the possibility that ink or paper will be wasted. Accordingly, in the third embodiment, printing by the printer server 200 can be forcibly stopped. This will be described below.

Figure 9:
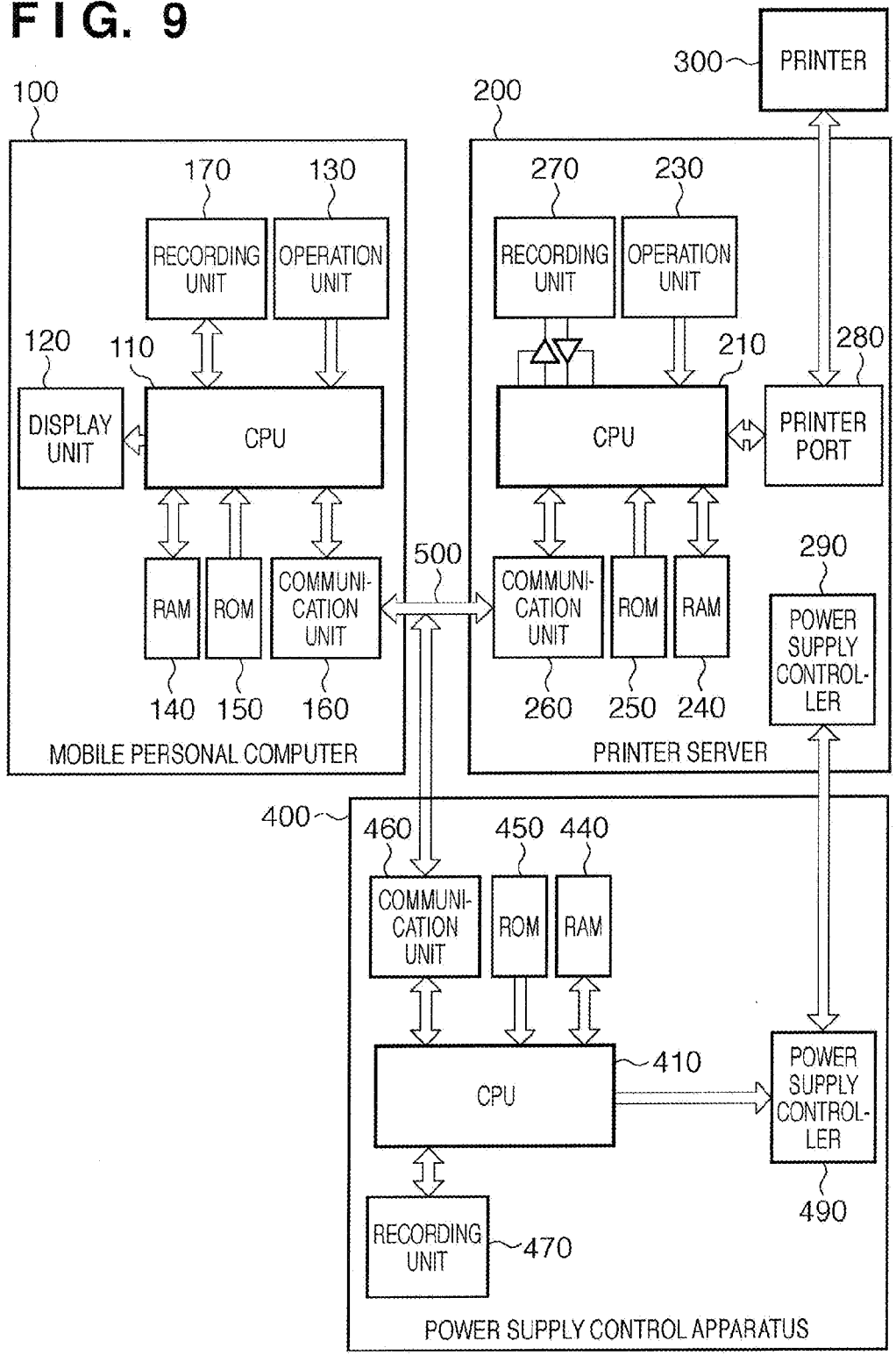
FIG. 9 is a block diagram illustrating the configurations of the mobile personal computer 100 and printer server 200 according to a third embodiment of the present invention.

FIG. 9 is a block diagram illustrating the configurations of the mobile personal computer 100 and printer server 200 according to the third embodiment of the present invention. Blocks in FIG. 9 having functions identical with or similar to those shown in FIG. 1 are designated by like reference characters and need not be described again.

In the third embodiment, a power supply control apparatus 400 has been connected to the mobile personal computer 100 and printer server 200. In the power supply control apparatus 400, a CPU 410 includes a processor core and peripheral circuits such as a general-purpose I/O port and an AD converter and is capable of executing a program. A RAM 440 serving as a primary storage device and a ROM 450 serving as a secondary storage device in which a program has been stored are connected to the CPU 410. A communication unit 460 connects the power supply control apparatus 400 to the mobile personal computer 100 and printer server 200 via the communication units 160 and 260, respectively. A recording unit 470 stores a control file for the power supply control apparatus 400. Accordingly, the power supply control apparatus 400 functions as a control apparatus which can be controlled using a file sharing protocol in a manner similar to that of the printer server 200. A power supply controller 490 controls a power supply controller 290 in the printer server 200, thereby turning the power supply of the printer server 200 on and off.

Figure 10:
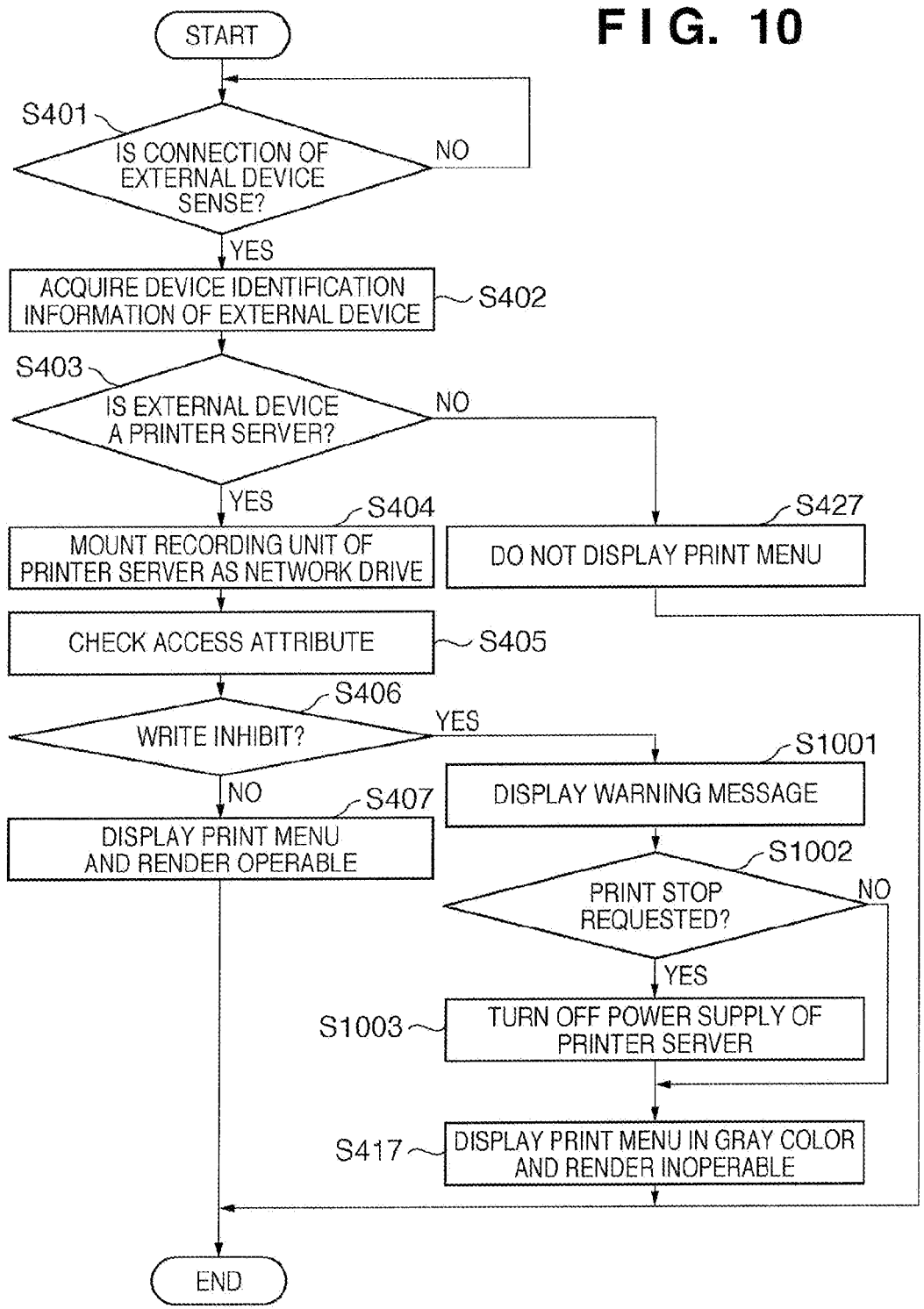
FIG. 10 is a flowchart illustrating processing executed by the mobile personal computer 100 when the printer server 200 is connected in the third embodiment.

FIG. 10 is a flowchart illustrating processing executed by the mobile personal computer 100 when the printer server 200 is connected. Processing steps in FIG. 10 identical with or similar to those in FIG. 4 are designated by like step numbers and need not be described again. The CPU 110 displays the window of the warning message, shown in FIG. 6, at step S1001. This window has the print stop button 601, as shown in FIG. 6. At step S1002, the CPU 110 determines whether the print stop button 601 has been pressed. Processing proceeds to step S1003 if the print stop button 601 is pressed.

At step S1003, the CPU 110 writes a command flag and a command, which instructs that the power supply of the printer server 200 is to be turned off, to a control file that has been stored in the recording unit 470 of power supply control apparatus 400. As a result, the power supply control apparatus 400 turns off the power supply of the printer server 200 via the power supply controller 490 and power supply controller 290. Accordingly, printing currently being executed by the printer server 200 is forcibly stopped and wasting of ink and paper can be avoided.

It should be noted that the method whereby the mobile personal computer 100 instructs the power supply control apparatus 400 is not limited to use of a control file. In this embodiment, it will suffice if the CPU 110 instructs the power supply control apparatus 400 so as to turn off the power supply of the printer server 200 regardless of the method used.

Fourth Embodiment

In the third embodiment, the power supply control apparatus 400 is necessary in order to stop printing. In addition, it is necessary to turn off the power supply of the printer server 200. By contrast, the fourth embodiment dispenses with the power supply control apparatus 400 and makes it unnecessary to turn off the power supply of the printer server 200. This will now be described. The fourth embodiment is similar to the first embodiment except for the fact that the flowchart of FIG. 11 is used instead of the flowchart of FIG. 4. Further, processing steps in FIG. 11 identical with or similar to those in FIG. 4 or FIG. 10 are designated by like step numbers and need not be described again.

FIG. 11 is a flowchart illustrating processing executed by the mobile personal computer 100 when the printer server 200 is connected in the fourth embodiment. At step S1101, the CPU 110 accesses the recording unit 270 of printer server 200 in an administrator mode and sets the recording unit 270 to "write enable". At step S1102, the CPU 110 writes a command flag and a command, which instructs print stop, to a control file that has been stored in the recording unit 270. As a result, the printer server 200 stops printing currently in progress and prevents wasting of ink and paper. At step S1103, the CPU 110 accesses the recording unit 270 of printer server 200 in the administrator mode and sets the recording unit 270 to "write inhibit".

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288420, filed on Dec. 18, 2009, which is hereby incorporated by reference herein in its entirety.

What is claimed is:

1. A control apparatus capable of being connected to a predetermined recording apparatus, which has a recording medium configured to record a control file and executes processing in accordance with a command that is written to the control file, the control apparatus comprising:
    a display control unit configured to display, on a display unit, a control menu for accepting a control instruction to the predetermined recording apparatus by a user operation;
    a writing control unit configured to control to write a command corresponding to the control instruction accepted using the control menu to the control file in the recording medium; and
    a first determination unit configured to determine whether or not a data-writing inhibit state is set by a hardware switch of the recording apparatus after detecting connection to the predetermined recording apparatus and recognizing the predetermined recording apparatus, wherein the data-writing inhibit state is a state for inhibiting data from being written to the recording medium,
    wherein if it is determined by the first determination unit that the data-writing inhibit state is set, the display control unit controls the display unit so as to make a user recognize that the user cannot control the predetermined recording apparatus using the control menu.

2. The apparatus according to claim 1, wherein if it is determined by the first determination unit that the data-writing inhibit state is set, the display control unit controls not to display the control menu.

3. The apparatus according to claim 1, wherein if it is determined by the first determination unit that the data-writing inhibit state is set, the display control unit controls to display the control menu in a manner that a selection on the control menu is impossible.

4. The apparatus according to claim 3, wherein if it is determined by the first determination unit that the data-writing inhibit state is set, the display control unit causes the control menu displayed on the display unit to be grayed out.

5. The apparatus according to claim 4, further comprising a second determination unit configured to determine whether or not an apparatus connected to the control apparatus is the predetermined recording apparatus,
    wherein if it is determined by the second determination unit that the apparatus connected to the control apparatus is not the predetermined recording apparatus, the display control unit controls not to display the control menu regardless of whether or not the data-writing inhibit state is set.

6. The apparatus according to claim 1, further comprising a second determination unit configured to determine whether or not an apparatus connected to the control apparatus is the predetermined recording apparatus,
    wherein if it is determined by the second determination unit that the apparatus connected to the control apparatus is not the predetermined recording apparatus, the display control unit controls not to display the control menu regardless of whether or not the data-writing inhibit state is set.

7. The apparatus according to claim 1, wherein the writing control unit controls to read the control file to obtain a result of processing corresponding to the command written to the control file.

8. The apparatus according to claim 1, wherein the command and a result of processing corresponding to the command are written to a single control file.

9. The apparatus according to claim 1, wherein the control file has a flag area, and
when the control instruction is accepted using the control menu, the writing control unit controls to change a state of a flag in the flag area.

10. The apparatus according to claim 9, wherein the command and the state of the flag are written to a single control file.

11. The apparatus according to claim 1, wherein if it is determined by the first determination unit that the data-writing inhibit state is set, the display control unit displays a notification on the display unit, the notification notifying that the data-writing inhibit state is set.

12. The apparatus according to claim 1, wherein the control apparatus is a mobile device.

13. The apparatus according to claim 1, wherein the processing is printing processing.

14. The apparatus according to claim 1, wherein the control apparatus connects to the predetermined recording apparatus via a wired connection.

15. A method of controlling a control apparatus capable of being connected to a predetermined recording apparatus, which has a recording medium configured to record a control file and executes processing in accordance with a command that is written to the control file, the method comprising:
displaying, on a display unit, a control menu for accepting a control instruction to the predetermined recording apparatus by a user operation;
controlling to write a command corresponding to the control instruction accepted using the control menu to the control file in the recording medium; and
determining whether or not a data-writing inhibit state is set by a hardware switch of the recording apparatus after detecting connection to the predetermined recording apparatus and recognizing the predetermined recording apparatus, wherein the data-writing inhibit state is a state for inhibiting data from being written to the recording medium,
wherein if it is determined that the data-writing inhibit state is set, the displaying controls the display unit so as to make a user recognize that the user cannot control the predetermined recording apparatus using the control menu.

16. A non-transitory computer-readable storage medium on which has been recorded a program for causing a computer to execute a method of controlling a control apparatus capable of being connected to a predetermined recording apparatus, which has a recording medium configured to record a control file and executes processing in accordance with a command that is written to the control file, the method comprising:
displaying, on a display unit, a control menu for accepting a control instruction to the predetermined recording apparatus by a user operation;
controlling to write a command corresponding to the control instruction accepted using the control menu to the control file in the recording medium; and
determining whether or not a data-writing inhibit state is set by a hardware switch of the recording apparatus after detecting connection to the predetermined recording apparatus and recognizing the predetermined recording apparatus, wherein the data-writing inhibit state is a state for inhibiting data from being written to the recording medium,
wherein if it is determined that the data-writing inhibit state is set, the displaying controls the display unit so as to make a user recognize that the user cannot control the predetermined recording apparatus using the control menu.

17. A control apparatus capable of being connected to a predetermined recording apparatus, which has a recording medium configured to record a control file and executes processing in accordance with a command that is written to the control file, the control apparatus comprising:
a detecting unit configured to detect that the predetermined recording apparatus is connected to the control apparatus;
a display control unit configured to display, on a display unit, a control menu for accepting a control instruction to the predetermined recording apparatus by a user operation;
a writing control unit configured to control to write a command corresponding to the control instruction accepted using the control menu to the control file in the recording medium; and
a first determination unit configured to determine, in a state in which the predetermined recording apparatus is connected to the control apparatus, whether or not a data-writing inhibit state is set by a hardware switch of the recording apparatus, wherein the data-writing inhibit state is a state for inhibiting data from being written to the recording medium,
wherein if the detecting unit does not detect the connection of the predetermined recording apparatus, the display control unit controls the display unit so as to make a user, by a first display manner, recognize that the user cannot control the predetermined recording apparatus using the control menu, and
wherein if it is determined by the first determination unit that the data-writing inhibit state is set, the display control unit controls the display unit so as to make a user, by a second display manner which is different from the first display manner, recognize that the user cannot control the predetermined recording apparatus using the control menu.

18. The apparatus according to claim 17, wherein if it is determined by the first determination unit that the data-writing inhibit state is set, the display control unit controls to display the control menu in a manner that a selection on the control menu is impossible.

19. The apparatus according to claim 18, wherein if it is determined by the first determination unit that the data-writing inhibit state is set, the display control unit causes the control menu displayed on the display unit to be grayed out.

20. The apparatus according to claim 19, further comprising a second determination unit configured to determine whether or not an apparatus connected to the control apparatus is the predetermined recording apparatus,
wherein if it is determined by the second determination unit that the apparatus connected to the control apparatus is not the predetermined recording apparatus, the display control unit controls not to display the control menu regardless of whether or not the data-writing inhibit state is set.

21. The apparatus according to claim 17, further comprising a second determination unit configured to determine whether or not an apparatus connected to the control apparatus is the predetermined recording apparatus,
wherein if it is determined by the second determination unit that the apparatus connected to the control apparatus is not the predetermined recording apparatus, the display control unit controls not to display the control menu regardless of whether or not the data-writing inhibit state is set.

22. The apparatus according to claim 17, wherein the writing control unit controls to read the control file to obtain a result of processing corresponding to the command written to the control file.

23. The apparatus according to claim 17, wherein the command and a result of processing corresponding to the command are written to a single control file.

24. The apparatus according to claim 17, wherein the control file has a flag area, and
when the control instruction is accepted using the control menu, the writing control unit controls to change a state of a flag in the flag area.

25. The apparatus according to claim 24, wherein the command and the state of the flag are written to a single control file.

26. The apparatus according to claim 17, wherein if it is determined by the first determination unit that the data-writing inhibit state is set, the display control unit displays a notification on the display unit, the notification notifying that the data-writing inhibit state is set.

27. The apparatus according to claim 17, wherein the control apparatus is a mobile device.

28. The apparatus according to claim 17, wherein the processing is printing processing.

29. The apparatus according to claim 17, wherein the control apparatus connects to the predetermined recording apparatus via a wired connection.

30. A method of controlling a control apparatus capable of being connected to a predetermined recording apparatus, which has a recording medium configured to record a control file and executes processing in accordance with a command that is written to the control file, the method comprising:
detecting that the predetermined recording apparatus is connected to the control apparatus;
displaying, on a display unit, a control menu for accepting a control instruction to the predetermined recording apparatus by a user operation;
controlling to write a command corresponding to the control instruction accepted using the control menu to the control file in the recording medium; and
determining, in a state in which the predetermined recording apparatus is connected to the control apparatus, whether or not a data-writing inhibit state is set by a hardware switch of the recording apparatus, wherein the data-writing inhibit state is a state for inhibiting data from being written to the recording medium,
wherein if the detecting does not detect the connection of the predetermined recording apparatus, the displaying controls the display unit so as to make a user, by a first display manner, recognize that the user cannot control the predetermined recording apparatus using the control menu, and
wherein if it is determined that the data-writing inhibit state is set, the displaying controls the display unit so as to make a user, by a second display manner which is different from the first display manner, recognize that the user cannot control the predetermined recording apparatus using the control menu.

31. A non-transitory computer-readable storage medium on which has been recorded a program for causing a computer to execute a method of controlling a control apparatus capable of being connected to a predetermined recording apparatus, which has a recording medium configured to record a control file and executes processing in accordance with a command that is written to the control file, the method comprising:
detecting that the predetermined recording apparatus is connected to the control apparatus;
displaying, on a display unit, a control menu for accepting a control instruction to the predetermined recording apparatus by a user operation;
controlling to write a command corresponding to the control instruction accepted using the control menu to the control file in the recording medium; and
determining, in a state in which the predetermined recording apparatus is connected to the control apparatus, whether or not a data-writing inhibit state is set by a hardware switch of the recording apparatus, wherein the data-writing inhibit state is a state for inhibiting data from being written to the recording medium,
wherein if the detecting does not detect the connection of the predetermined recording apparatus, the displaying controls the display unit so as to make a user, by a first display manner, recognize that the user cannot control the predetermined recording apparatus using the control menu, and
wherein if it is determined that the data-writing inhibit state is set, the displaying controls the display unit so as to make a user, by a second display manner which is different from the first display manner, recognize that the user cannot control the predetermined recording apparatus using the control menu.

* * * * *